(12) United States Patent
Saborowski et al.

(10) Patent No.: US 7,290,208 B2
(45) Date of Patent: Oct. 30, 2007

(54) EXECUTING A DIALOG USING ONE OR MORE XML COMPONENTS AND ONE OR MORE EMBEDDED SCRIPTS

(75) Inventors: Ralf D. Saborowski, Leichlingen (DE); Ansgar Trimborn, Bonn (DE)

(73) Assignee: Computer Associates Think, Inc., Islandia, NY (US)

( * ) Notice: Subject to any disclaimer, the term of this patent is extended or adjusted under 35 U.S.C. 154(b) by 11 days.

(21) Appl. No.: 11/141,334

(22) Filed: May 31, 2005

(65) Prior Publication Data

US 2006/0285656 A1  Dec. 21, 2006

(51) Int. Cl.
*G06F 15/00* (2006.01)

(52) U.S. Cl. .................. 715/530; 715/513; 715/744; 715/809

(58) Field of Classification Search ........... 715/530, 715/513, 744, 844
See application file for complete search history.

(56) References Cited

U.S. PATENT DOCUMENTS

| | | | |
|---|---|---|---|
| 5,983,364 A * | 11/1999 | Bortcosh et al. ............... 714/25 |
| 6,301,708 B1 | 10/2001 | Gazdik et al. ................. 717/11 |
| 2002/0101444 A1 * | 8/2002 | Novak et al. ................ 345/744 |
| 2002/0124245 A1 * | 9/2002 | Maddux et al. ............. 717/176 |
| 2002/0129129 A1 * | 9/2002 | Bloch et al. ................. 709/220 |
| 2002/0147974 A1 * | 10/2002 | Wookey ....................... 717/176 |
| 2002/0178252 A1 * | 11/2002 | Balabhadrapatruni et al. ............ 709/223 |
| 2003/0025693 A1 | 2/2003 | Haley .......................... 345/418 |
| 2004/0059929 A1 * | 3/2004 | Rodgers et al. ............. 713/193 |
| 2004/0061713 A1 * | 4/2004 | Jennings ...................... 345/700 |
| 2005/0028173 A1 * | 2/2005 | Aiba ............................ 719/327 |
| 2005/0097579 A1 | 5/2005 | Dorn et al. .................. 719/330 |

OTHER PUBLICATIONS

Notification of Transmittal of the International Search Report and the Written Opinion of the International Searching Authority or the Declaration, International Application No. PCT/US2006/020559, Computer Associates Think, Inc., International filing date: May 26, 2006, 15 pages, Dec. 19, 2006.

Bullard, et al.; *Essential XUL Programming*; XP-002410130; 10 pages, 2001.

* cited by examiner

*Primary Examiner*—Fan Tsang
*Assistant Examiner*—Hemant Patel
(74) *Attorney, Agent, or Firm*—Baker Botts L.L.P.

(57) ABSTRACT

In one embodiment, a system for executing a dialog using one or more Extensible Markup Language (XML) components and one or more embedded scripts includes an XML engine that parses an XML component describing a dialog. The XML component includes elements describing visual aspects of user interfaces (UIs) of the dialog and scripts describing functional aspects of the dialog. The system includes a graphical user interface (GUI) framework operable to access elements parsed from the XML component by the XML engine and generate the UIs of the dialog from the elements parsed from the XML component. The system includes a script engine including an interpreter that executes the scripts in the XML component in response to particular events to provide the functional aspects of the dialog and a runtime library including particular functions callable from the scripts in the XML component that provide particular functional aspects of the dialog when called. The scripts in the XML component have read/write access to elements parsed from the XML component by the XML engine.

29 Claims, 2 Drawing Sheets

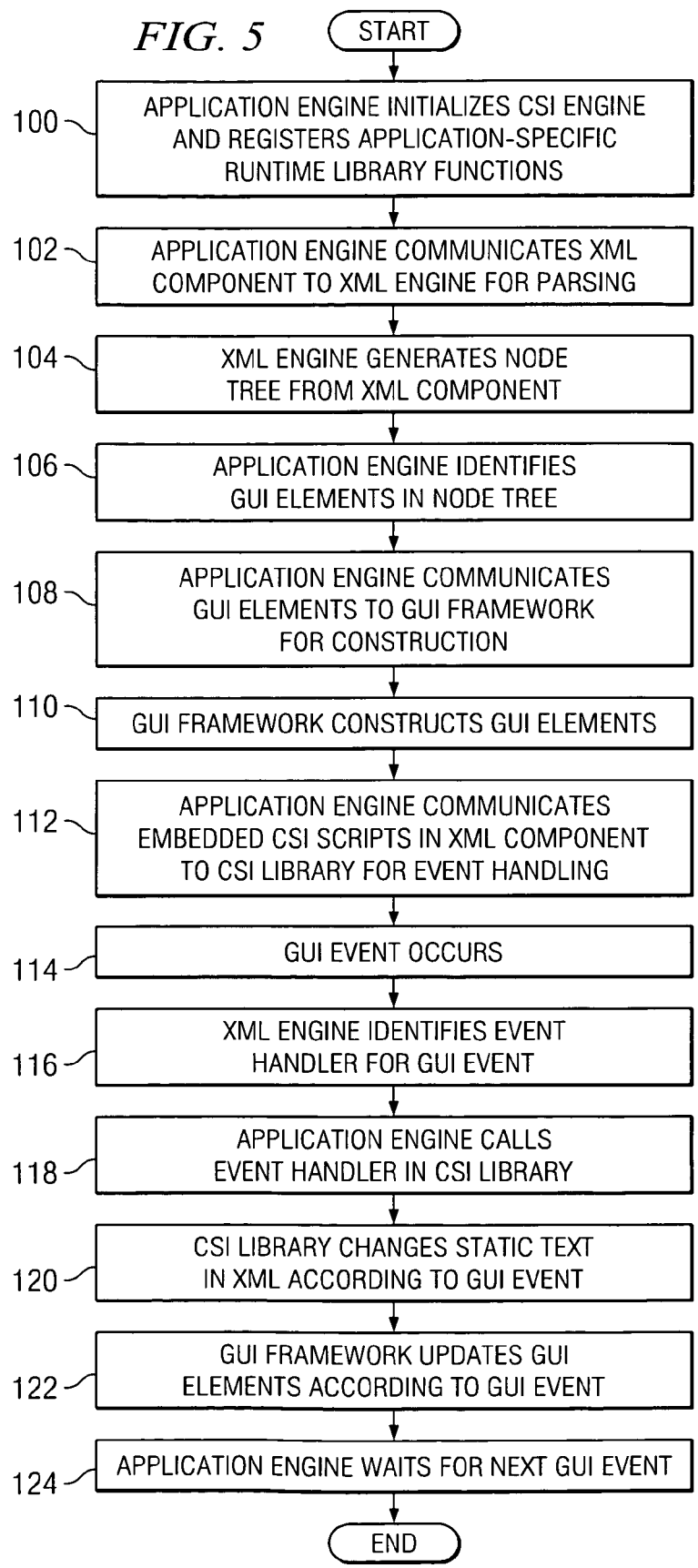

EXECUTING A DIALOG USING ONE OR MORE XML COMPONENTS AND ONE OR MORE EMBEDDED SCRIPTS

TECHNICAL FIELD OF THE INVENTION

This invention relates in general to dialog-based applications and more particularly to executing a dialog using one or more Extensible Markup Language (XML) components and one or more embedded scripts.

BACKGROUND OF THE INVENTION

Installation tools (such as InstallShield) generally are not flexible enough to meet various advanced requirements. As an example, such tools generally are unable to implement visually and functionally interesting user interfaces (UIs). As another example, such tools generally are unable to accommodate various installation routines associated with various products. As yet another example, such tools generally are not well integrated with their dialog components.

SUMMARY OF THE INVENTION

Particular embodiments of the present invention may reduce or eliminate problems and disadvantages associated with previous dialog-based applications.

In one embodiment, a system for executing a dialog using one or more Extensible Markup Language (XML) components and one or more embedded scripts includes an XML engine that parses an XML component describing a dialog. The XML component includes elements describing visual aspects of user interfaces (UIs) of the dialog and scripts describing functional aspects of the dialog. The system includes a graphical user interface (GUI) framework operable to access elements parsed from the XML component by the XML engine and generate the UIs of the dialog from the elements parsed from the XML component. The system includes a script engine including an interpreter that executes the scripts in the XML component in response to particular events to provide the functional aspects of the dialog and a runtime library including particular functions callable from the scripts in the XML component that provide particular functional aspects of the dialog when called. The scripts in the XML component have read/write access to elements parsed from the XML component by the XML engine.

Particular embodiments of the present invention provide one or more technical advantages. As an example, particular embodiments provide an installation wrapper that facilitates seamless installation onto a target computer system of products from a suite of products. Particular embodiments facilitate implementation of visually and functionally interesting UIs in an installation wrapper. Particular embodiments facilitate rapid design and implementation of an installation wrapper. Particular embodiments allow external definition of data and logic providing look and feel to an installation wrapper. Particular embodiments facilitate accommodation of various installation routines associated with various products by an installation wrapper. Particular embodiments facilitate conditional execution of installations steps. As an example, in such embodiments, a dialog for installing products onto a target computer system executed by an installation wrapper may depend on products already at the target computer system.

Particular embodiments facilitate adaptation of an installation wrapper to new versions of suites of products. Particular embodiments facilitate access to system information (such as registry settings and locations of temporary directories) from an installation wrapper. Particular embodiments provide an installation wrapper adaptable to future products and requirements. Particular embodiments support localization of UI elements. Particular embodiments facilitate event-driven installation. Particular embodiments facilitate creation of dialog-based applications having visually and functionally interesting user interfaces.

Particular embodiments significantly reduce time requirements typically associated with developing a dialog-based application. In particular embodiments, a compile/link cycle need not be part of developing a dialog-based application and, as a result, design and implementation results are viewable and ready for evaluation more or less immediately. Particular embodiments significantly reduce expertise requirements typically associated with a developing dialog-based application. As an example, in at least some such embodiments, a person need not have significant training in programming to develop a dialog-based application. Particular embodiments are independent of external tools, which reduces overall cost and resource requirements typically associated with developing dialog-based applications. Particular embodiments are substantially self-contained and obviate any need for third-party libraries and tools. Such embodiments tend to reduce costs associated with royalties that may otherwise be owed as a result of using third-party libraries and tools.

Particular embodiments are extensible. As an example, particular embodiments are useable to develop any suitable dialog-based applications, and not just dialog-based installation tools. Particular embodiment facilitate developing applications that are substantially localizable. Particular embodiments facilitate development of applications that are easily maintainable. Particular embodiments are independent of a platform and may therefore run on any suitable platform. Particular embodiments facilitate template-driven development of applications offering more control over user input and application flow, which may provide applications having more versatility.

Particular embodiments may provide all, some, or none of these technical advantages. Particular embodiments may provide one or more other technical advantages, one or more of which may be readily apparent to those skilled in the art from the figures, descriptions, and claims herein.

BRIEF DESCRIPTION OF THE DRAWINGS

To provide a more complete understanding of the present invention and features and advantages thereof, reference is made to the following description, taken in conjunction with the accompanying drawings, in which:

FIG. 5 illustrates an example method for executing a dialog using one or more XML components and one or more embedded scripts in the XML components.

DESCRIPTION OF EXAMPLE EMBODIMENTS

Figure 1:
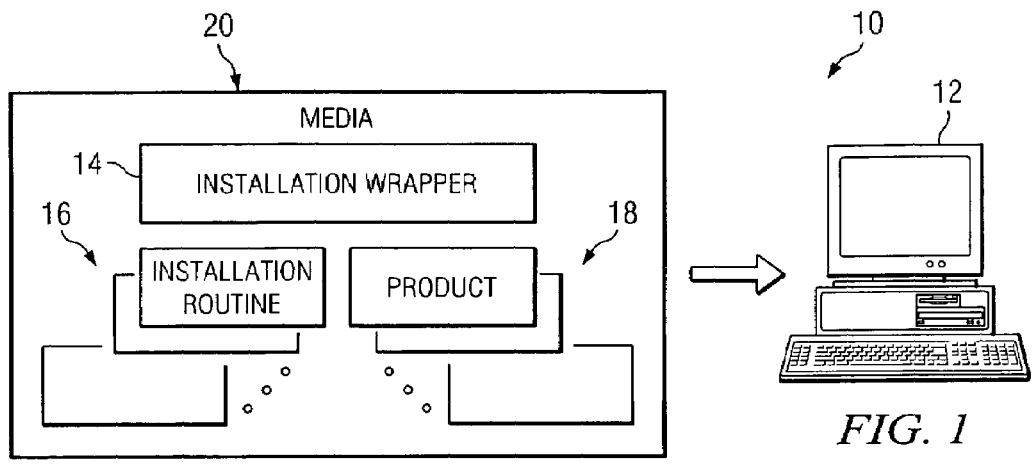
FIG. 1 illustrates an example system for executing a dialog using one or more XML components and one or more embedded scripts in the XML components.

FIG. 1 illustrates an example system 10 for executing a dialog using one or more XML components and one or more embedded scripts in the one or more XML components. In particular embodiments, an XML component includes one or more XML files, one or more other XML components, or both. Reference to an XML file encompasses the XML file, contents of the XML file, or both, where appropriate. In particular embodiments, a dialog includes a series of displays (such as dialog boxes) or other UIs and interactions guiding a user through a series of steps. As an example and not by way of limitation, a dialog may include a series of displays and interactions guiding a user through installation of one or more products 18 onto a target computer system 12.

System 10 includes a target computer system 12 and an installation wrapper 14, multiple installation routines 16, and a suite of multiple products 18 readable from one or more media 20. In particular embodiments, target computer system 12 is a desktop computer system, a laptop computer system, or other computer system. Target computer system 12 includes one or more target computer systems 12. In particular embodiments, media 20 includes one or more compact discs (CDs) or other media 20 readable by target computer system 12. Installation wrapper 14, installation routines 16, and products 18 are software components. In particular embodiments, a product 18 is a software component (such as, for example, an executable application) for installation onto target computer system 12. In particular embodiments, an installation routine 16 is a particular software component that specifically handles installation for one or more particular products 18. As an example and not by way of limitation, an installation routine 16 may include one or more XML files that may, but need not, include one or more embedded scripts and one or more external scripts referenced in the XML files. A first product 18 on media 20 may have a first installation routine 20 different from one or more second installation routines 20 of one or more second products 18 on media 20. Installation wrapper 14 facilitates installation of products 18 from media 20 onto target computer system 12. To facilitate installation of one or more products 18 from media 20 onto target computer system 12, installation wrapper 14 executes a dialog for installing products 18 from media 20 onto computer system 12 and invokes one or more installation routines 16 of products 18, according to particular needs. In particular embodiments, installation wrapper 14 provides an installation dialog that includes one or more visually and functionally interesting UIs, accommodates all installation routines 16 of all products 18 in the suite of products 18 on media 20, and carries out installation in such a way that a user at target computer system 12 is not necessarily aware that installation wrapper 14 is installing multiple products 18 onto target computer system 12. Although an installation wrapper 14 is illustrated and described, the present invention contemplates any suitable dialog-based application or dialog-based portion of an application and is not limited to installation wrappers 14 or other tools for installing products 18 onto target computer systems 12.

Figure 2:
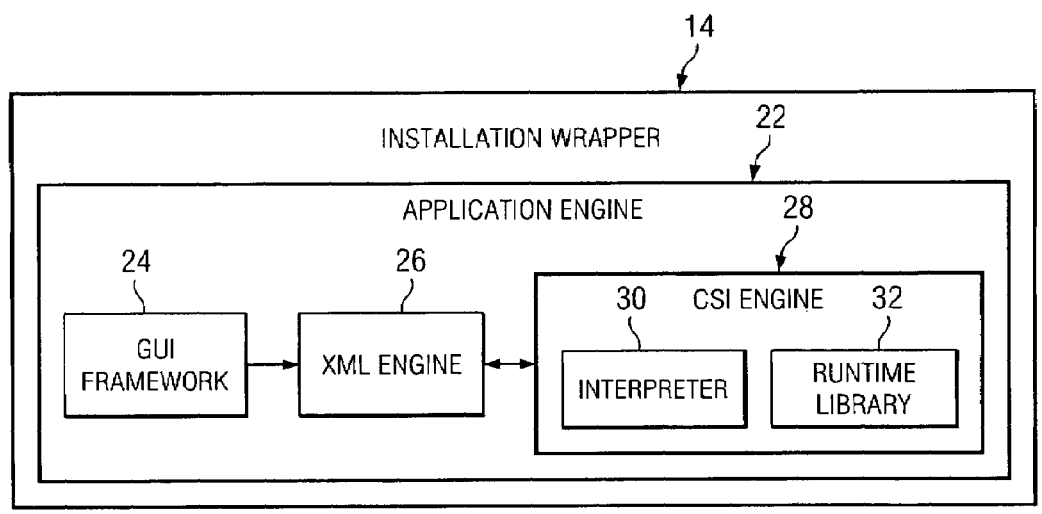
FIG. 2 illustrates an example installation wrapper from the system illustrated in FIG. 1.

FIG. 2 illustrates an example installation wrapper 14. Installation wrapper 14 includes an application engine 22. Application engine 22 includes a graphical user interface (GUI) framework 24, an XML engine 26, and a C Script Interpreter (CSI) engine 28. Although CSI is illustrated and described, the present invention contemplates any suitable scripting language and is not limited to a scripting language based on C or C++. In particular embodiments, GUI framework 24, XML engine 26, and CSI engine 28 are separate from each other. In particular embodiments, one or more components of application engine 22 collectively include one or more components of each of two or more of GUI framework 24, XML engine 26, and CSI engine 28.

Application engine 22 uses GUI framework 24, XML engine 26, and CSI engine 28 to load an XML component describing the visual appearance of installation wrapper 14 to a user at target computer system 12 and—with embedded CSI scripts in the XML component or external CSI scripts referenced in the XML component—the functionality of installation wrapper 14, create GUI elements, and run CSI functions. As an example and not by way of limitation, at startup, application engine 22 may load the XML component, pass the XML component to XML engine 26, walk a node tree generated from the XML component by the XML engine 26 to load embedded scripts into CSI engine 28, load and manage defined string tables and image lists, walk the node tree to identify a first dialog box, create an object for the first dialog box, and display the first dialog box. At runtime, application engine 22 may provide access to globally set items, such as, for example, skinning colors and default $\chi$ positions, provide conversion functions, such as, for example, COLORREF conversion, provide access and lookup to loaded string tables and image lists, create a next dialog box, and jump to a next dialog box.

Application engine 22 passes work related to a GUI—such as construction of a dialog box—to GUI framework 24. As an example and not by way of limitation, application engine 22 may detect a change in XML data, such as a change in text of a control, and call GUI framework 24 to exhibit the changes in a display of one or more GUI elements. In particular embodiments, GUI framework 24 includes a hierarchy of classes describing various GUI elements. As an example and not by way of limitation, GUI framework 24 may include a class describing a GUI element that provides one or more UIs for a dialog and controls the dialog. The GUI element may automatically create itself from an XML definition; skin itself with a background bitmap or a gradient fill defined by a pair of colors; create, destroy, and manage controls in the dialog; and determine a next dialog box, a previous dialog box, or both for display.

In particular embodiments, XML engine 26 is an XML parser. Application engine 22 uses XML engine 26 to read an XML component describing an application. In particular embodiments, XML engine 26 generates a node tree (or other representation) from the XML component and application engine 22 thereafter works with the node tree instead of the XML component. In particular embodiments, the node tree is an in-memory representation accessible to application engine 22.

In particular embodiments, CSI engine 28 executes embedded CSI scripts in an XML component loaded by application engine 22. CSI engine 28 has read/write access to the XML component after XML engine 26 has generated a node tree from the XML component for application engine 22. CSI engine 28 includes an interpreter 30 and a runtime library 32 that provides functions callable from CSI scripts. In particular embodiments, runtime library 32 includes both core runtime functions executable on any operating system (OS) platform and platform-specific functions (such as, for example, functions providing access to WINDOWS registries that do not have an equivalent on LINUX or MACINTOSH OSs). In particular embodiments, CSI engine 28 exposes an interface that allows one or more clients (such as, in this case, XML engine 26) to register runtime library extensions for specific purposes. In particular embodiments, CSI engine 28 is useable independent of XML engine 26 by other applications requiring scripting and registering another set of runtime library extensions.

Consider the following example XML source from an example XML component:

```
<?xml version="1.0"?>
<tiapplication caption="Sample TI application" font="Arial"
    fontcolor="#FF0000" xdefault="200"
    skincolortop="#F0FBFD" skincolorbottom="#AED2EA">
    <dialog name="dlgMain" len="260" height="160"
        button1="" button2="" finish="1">
        <statictext x="40" y="60" fontsize="5">
            <text>This is a static text</text>
        </statictext>
    </dialog>
</tiapplication>
```

Figure 3:
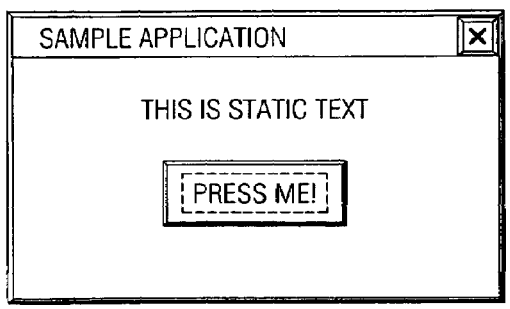
FIG. 3 illustrates an example dialog box.

The XML source above defines an application with a single dialog containing one static text control. The root element—tiapplication—represents the application itself. Child elements—such as dialog—represent a dialog, a CSI script, or specific application settings. Attributes of the dialog (such as size and background) are given as XML attributes of the corresponding XML node, e.g., height="160". Controls of a dialog become child elements of their dialog XML element, e.g., <statictext x="40" y="60" fontsize="5">. As a consequence, one XML element represents and fully describes one GUI element. A one-to-one relationship exists between XML elements and GUI elements represented and described by the XML elements. In particular embodiments, running the XML source above through application engine 22 results in the example dialog box illustrated in FIG. 3.

Figure 4:
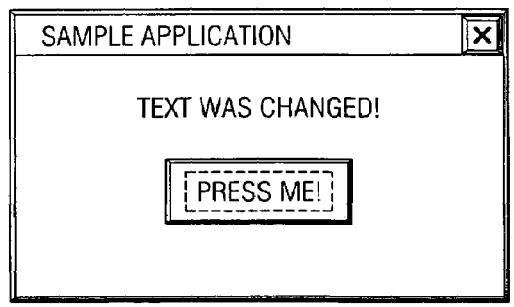
FIG. 4 illustrates an example change to text in the dialog box illustrated in FIG. 3.

A button or other selectable icon in the dialog box may add functionality. A click handler for the button may call a CSI script, which may in turn change text for the static control, as illustrated in FIG. 4.

```
<?xml version="1.0"?>
<tiapplication caption="Sample TI application" font="Arial"
    fontcolor="#FF0000" xdefault="200"
    skincolortop="#F0FBFD" skincolorbottom="#AED2EA">
    <dialog name="dlgMain" len="260" height="160"
        button1="" button2="" finish="1">
        <statictext name="static" x="40" y="60"
            fontsize="5">
            <text>This is a static text</text>
        </statictext>
    </dialog>
    <script>
    clickhandler( )
    {
        $(dlgMain:static:text) = "Text was changed!";
    }
    </script>
</tiapplication>
```

The CSI script function clickhandler( ) has write access to the text element of the static text control. Read access is also available, so CSI scripts have control over XML data and, consequently, the application itself.

In particular embodiments, application engine 22 supports string tables that facilitate translation and localization. A string table includes one or more external files including strings to which an XML source refers by a string identifier.

As an example and not by way of limitation, application engine 22 may use a string table as follows:

```
<tiapplication caption="Total Client Protection Install"
    font="Arial"
    fontcolor="#004080" xdefault="200" skin="main.bmp"
    button1="< Back" button2="*> Next"
    stringtable="idrive.stb">
    <dialog name="dlgMain" button1="" button2="">
        <statictext x="40" y="142" fontsize="5"
            fontcolor="#326698">
            <text>##SID_MAIN</text>
        </statictext>
```

The XML source above specifies the string table idrive.stb. The static text in the dialog box illustrated in FIG. 3 may load the string from idrive.stb with the identifier SID_MAIN.

FIG. 5 illustrates an example method for executing a dialog using one or more XML components and one or more embedded scripts in the XML components. The method starts at step 100, where application engine 22 initializes CSI engine 28 and registers application-specific runtime library functions. At step 102, application engine 22 communicates an XML component describing an application (such as installation wrapper 14) to XML engine 26 for parsing. At step 104, XML engine 26 generates a node tree from the XML component. At step 106, application engine 22 identifies one or more GUI elements in the node tree. At step 108, application engine 22 communicates the GUI elements to GUI framework 24 for construction. At step 110, GUI framework 24 constructs the GUI elements. At step 112, application engine 22 communicates one or more embedded CSI scripts in the XML component to CSI engine 28 for event handling. At step 114, a GUI event occurs. At step 116, XML engine 26 identifies an event handler for the GUI event. At step 118, application engine 22 calls the event handler in CSI engine 28. At step 120, CSI engine 28 changes static text in XML according to the GUI event. At step 122, GUI framework 24 updates one or more GUI elements according to the GUI event. At step 124, application engine 22 waits for a next GUI event, at which point the method ends. Steps 116-122 may repeat for each GUI event that occurs. Although particular steps of the method illustrated in FIG. 5 are illustrated and described as occurring in a particular order, the present invention contemplates any suitable steps of the method illustrated in FIG. 5 occurring in any suitable order.

Particular embodiments have been used to describe the present invention, and a person having skill in the art may comprehend one or more changes, substitutions, variations, alterations, or modifications to the particular embodiments used to describe the present invention. The present invention encompasses all such changes, substitutions, variations, alterations, and modifications within the scope of the appended claims.

What is claimed is:

1. A system for executing a dialog using one or more Extensible Markup Language (XML) components and one or more embedded scripts, the system comprising:
    an XML engine operable to parse an XML component describing a dialog, the XML component comprising one or more elements describing one or more visual aspects of one or more user interfaces (UIs) of the dialog and one or more scripts describing one or more functional aspects of the dialog;

a graphical user interface (GUI) framework operable to access one or more elements parsed from the XML component by the XML engine and generate the UIs of the dialog from the elements parsed from the XML component;

a script engine operable to read and write to the scripts in the XML component, the script engine comprising:

an interpreter operable to execute the scripts in the XML component in response to particular events to provide the functional aspects of the dialog; and a runtime library comprising particular functions callable from the scripts in the XML component that provide particular functional aspects of the dialog when called.

2. The system of claim 1, wherein:

a first one or more of the functions in the runtime library are core runtime functions executable on multiple operating system (OS) platforms; and a second one or more of the functions in the runtime library are each specific to one or more particular OS platforms.

3. The system of claim 1, wherein the script engine is further operable to enable a client to register one or more runtime library extensions for one or more specific purposes.

4. The system of claim 1, wherein the XML engine, the GUI framework, and the script interpreter are constituents of an application.

5. The system of claim 4, wherein the application is an installation wrapper.

6. The system of claim 5, wherein the installation wrapper readily accommodates a plurality of installation routines of a plurality of products installable onto a target computer system.

7. The system of claim 1, wherein the dialog comprises a series of UIs and interactions guiding a user through a series of steps.

8. The system of claim 7, wherein the dialog guides the user through installation of one or more products onto a target computer system.

9. The system of claim 1, wherein at least one of the particular events comprises activation of a particular control by a user.

10. The system of claim 9, wherein activation of the particular control comprises the user selecting an icon in a UI of the dialog.

11. The system of claim 1, where parsing the XML component comprises generating a node tree of the XML component.

12. The system of claim 1, wherein the XML component is an XML file.

13. The system of claim 1, wherein at least one of the scripts is based on C or C++.

14. The system of claim 1, wherein the script interpreter is a C Script Interpreter (CSI).

15. A method for executing a dialog using one or more Extensible Markup Language (XML) components and one or more embedded scripts, the method comprising:

using an XML engine, parsing an XML component describing a dialog, the XML component comprising one or more elements describing one or more visual aspects of one or more user interfaces (UIs) of the dialog and one or more scripts describing one or more functional aspects of the dialog;

using a graphical user interface (GUI) framework, accessing one or more elements parsed from the XML component using the XML engine and generating the UIs of the dialog from the elements parsed from the XML component;

using a script engine, reading and writing to the scripts in the XML component;

using a script interpreter associated with a script engine, executing the scripts in the XML component in response to particular events to provide the functional aspects of the dialog; and using a runtime library associated with the script engine, calling particular functions from the scripts in the XML component that provide particular functional aspects of the dialog when called.

16. The method of claim 15, wherein:

a first one or more of the functions in the runtime library are core runtime functions executable on multiple operating system (OS) platforms; and a second one or more of the functions in the runtime library are each specific to one or more particular OS platforms.

17. The method of claim 15, further comprising using the script engine to enable a client to register one or more runtime library extensions for one or more specific purposes.

18. The method of claim 15, wherein the XML engine, the GUI framework, and the script interpreter are constituents of an application.

19. The method of claim 18, wherein the application is an installation wrapper.

20. The method of claim 19, wherein the installation wrapper readily accommodates a plurality of installation routines of a plurality of products installable onto a target computer system.

21. The method of claim 15, wherein the dialog comprises a series of UIs and interactions guiding a user through a series of steps.

22. The method of claim 21, wherein the dialog guides the user through installation of one or more products onto a target computer system.

23. The method of claim 15, wherein at least one of the particular events comprises activation of a particular control by a user.

24. The method of claim 23, wherein activation of the particular control comprises the user selecting an icon in a UI of the dialog.

25. The method of claim 15, where parsing the XML component comprises generating a node tree of the XML component.

26. The method of claim 15, wherein the XML component is an XML file.

27. The method of claim 15, wherein at least one of the scripts is based on C or C++.

28. The method of claim 15, wherein the script interpreter is a C Script Interpreter (CSI).

29. A system for executing a dialog using one or more Extensible Markup Language (XML) components and one or more embedded scripts, the system comprising:

means for parsing an XML component describing a dialog, the XML component comprising one or more elements describing one or more visual aspects of one or more user interfaces (UIs) of the dialog and one or more scripts describing one or more functional aspects of the dialog;

means for accessing one or more elements parsed from the XML component and generating the UIs of the dialog from the elements parsed from the XML component;

means for reading and writing to the scripts in the XML component;

means for executing the scripts in the XML component in response to particular events to provide the functional aspects of the dialog; and means for calling particular functions from the scripts in the XML component that provide particular functional aspects of the dialog when called.

* * * * *